US011803646B2

(12) United States Patent
Shivanna

(10) Patent No.: US 11,803,646 B2
(45) Date of Patent: Oct. 31, 2023

(54) VULNERABILITY SCANNING

(71) Applicant: Hewlett Packard Enterprise Development LP, Houston, TX (US)

(72) Inventor: Suhas Shivanna, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 295 days.

(21) Appl. No.: 17/237,381

(22) Filed: Apr. 22, 2021

(65) Prior Publication Data

US 2022/0245258 A1    Aug. 4, 2022

(30) Foreign Application Priority Data

Jan. 30, 2021   (IN) .............................. 202141004151

(51) Int. Cl.
   *G06F 21/57*     (2013.01)
(52) U.S. Cl.
   CPC ...... *G06F 21/577* (2013.01); *G06F 2221/034* (2013.01)
(58) Field of Classification Search
   None
   See application file for complete search history.

(56) References Cited

U.S. PATENT DOCUMENTS

| 7,712,138 | B2   | 5/2010  | Zobel et al. |
| 8,695,099 | B2   | 4/2014  | Baikalov et al. |
| 10,044,675 | B1* | 8/2018 | Ettema ................ H04L 63/0227 |
| 10,819,733 | B2   | 10/2020 | Duchin et al. |
| 2014/0351934 | A1* | 11/2014 | Mitra ..................... G06F 21/567 726/23 |
| 2018/0268034 | A1 | 9/2018 | Kraning et al. |
| 2021/0226927 | A1* | 7/2021 | Crabtree ................ G06N 5/022 |
| 2021/0273968 | A1* | 9/2021 | Shaieb ................ H04L 63/1433 |
| 2021/0279332 | A1* | 9/2021 | Goldshmidt ........ H04L 63/1491 |

OTHER PUBLICATIONS

Smart Fingerprinting, (Web Page), Retrieved Nov. 24, 2020, 5 Pgs.

* cited by examiner

*Primary Examiner* — Fatoumata Traore
(74) *Attorney, Agent, or Firm* — Trop, Pruner & Hu, P.C.

(57) ABSTRACT

Aspects of vulnerability scanning are disclosed. In one example, configuration and context information of a first device for which vulnerability scanning is to be performed is obtained. The configuration information includes telemetry data of the first device. A second device is provisioned based on the configuration information to create a cloned first device. The vulnerability scanning is performed on the cloned first device based on the context information to obtain a scan report.

18 Claims, 5 Drawing Sheets

VULNERABILITY SCANNING

BACKGROUND

Vulnerability scanning is used to assess computing devices to identify issues, also referred to as vulnerabilities, that may result in security threats. The vulnerabilities may include, for example, misconfigurations, missed security updates, unresolved errors, and the like. Attackers may be able to exploit the vulnerabilities and gain unauthorized access to the computing devices. Various scanning tools are available with different capabilities for identifying different types of vulnerabilities in different computing devices. Hence, a combination of scanning tools may be used when performing a vulnerability scan on a computing device.

BRIEF DESCRIPTION OF FIGURES

Systems and/or methods, in accordance with examples of the present subject matter are now described, by way of example, and with reference to the accompanying figures, in which.

DETAILED DESCRIPTION

Figure 1:
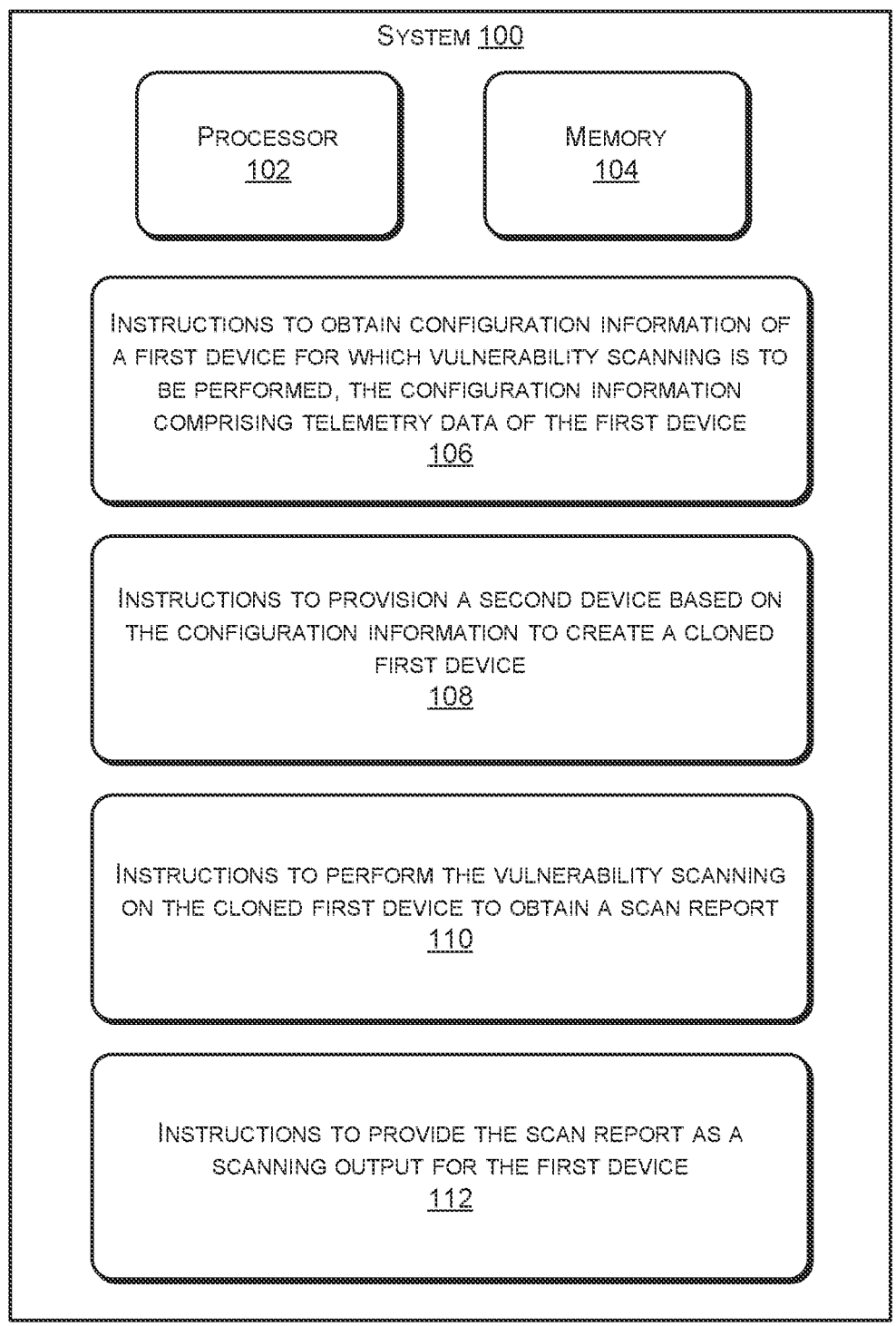
FIG. 1 illustrates an example system for vulnerability scanning, in accordance with principles of the present subject matter.

Vulnerability scanning of computing devices helps in ensuring data security and compliance with regulatory requisites. For example, organizations that deal with data in the financial sector have to comply with the Payment Card Industry Data Security Standard (PCI-DSS) which includes performing internal and external vulnerability scanning every quarter. As different scanning tools have different capabilities and features, a combination of scanning tools is used for effective scanning. Generally, an organization that includes multiple computing devices has to obtain licenses for multiple scanning tools for scanning the various devices, making it costly and inefficient.

Also, increasingly, organizations are moving towards decentralized network architectures, such as public and private cloud networks and Edge networks, for handling the increasing volumes of data generated by automation and digitization. In such cases, scanning the various edge and core computing devices becomes costly and time consuming as dedicated infrastructure and adequate network connectivity and bandwidth may have to be provided during the scan duration. The scanning tools may generate false positive results and the scanning results may have to be filtered and triaged based on risk and compliance requisites to obtain meaningful results. Inaccurate analysis of the scanning results may lead to missing some of the vulnerabilities or expending resources on handling noisy results.

Various aspects of the present subject matter provide for vulnerability scanning. In one example, configuration information of a first device for which vulnerability scanning is to be performed may be obtained. The configuration information may include telemetry data of the first device. The telemetry data may include, for example, a snapshot of the hardware and software configured on the first device. A second device may be provisioned based on the configuration information to create a cloned first device and the vulnerability scanning may be performed on the cloned first device to obtain a scan report.

The first device may be a remote device that is part of a remote network, such as an enterprise's edge or cloud network, while the second device may be part of another network environment, such as a service provider's cloud network. Thus, in accordance with the present subject matter, the vulnerability scanning for the remote device may be performed on a clone of the remote device created in the service provider's cloud network instead of directly scanning the remote device in the remote network. Hence, the vulnerability scanning may be effectively performed even in cases of poor network connectivity between the remote network and the service provider's cloud network. Further, the service provider's cloud network may be used to provide vulnerability scanning as a service for remote devices in various remote networks, thereby using the vulnerability scanning resources more efficiently and substantially reducing the overheads related to vulnerability scanning for the remote networks.

In one example, in addition to the configuration information, context information of the first device may be obtained. The context information may include data indicative of a security level of the first device, a user defined policy, compliance requisites, and an industry domain in which the first device operates. Accordingly, based on the context information and the configuration information, the vulnerability scanning may be scheduled and scanning tools may be selected for performing the vulnerability scanning. This may help to ensure that vulnerability scanning is periodically performed with the appropriate scanning tools and hence may reduce the possibility of security threats creeping in over time. It may also help to ensure that various regulatory compliance requisites for ensuring data security are complied with. Further, in some examples, the scanning results obtained from the execution of the various scanning tools may be processed to flag false positives and merge and triage issues to provide concise, useful, and actionable results in the vulnerability scan report.

In one example, a device fingerprint may be generated for the first device based on a device type, the context information, and the configuration information. The vulnerability scan report may be stored in a repository along with the device fingerprint. Subsequently, if vulnerability scanning has to be performed on another device, such as a third device, it may be determined whether a device fingerprint of the third device matches the device fingerprint of the first device. If the two device fingerprints match, it may indicate that the device type, configuration information, and context information of the two devices are identical. Hence, the vulnerability scan report that was generated for the first device may be provided as the scan output for the third device as well. Thus, redundant scanning of remote devices may be avoided without affecting the security of the remote devices and the speed with which scan outputs are provided may be improved.

Various example implementations of systems and methods that provide these and other advantages are further described in conjunction with appended figures. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and examples of the present subject matter, as well as specific examples thereof, are intended to encompass equivalents thereof.

In the figures, the left-most digit(s) of a reference number identifies the figure in which the reference number first appears. The same numbers are used throughout the figures to reference like features and components.

FIG. 1 illustrates an example system 100 for vulnerability scanning, in accordance with principles of the present subject matter. The system 100 may be implemented as a computing device, such as a desktop computer, a laptop computer, a server, or the like. The system 100 includes a processor 102 and a memory 104 coupled to the processor 102.

The processor 102 may be implemented as a microprocessor, a microcomputer, a microcontroller, a digital signal processor, a central processing unit, a state machine, a logic circuitry, and/or any device that can manipulate signals based on operational instructions. Among other capabilities, the processor 102 may fetch and execute computer-readable instructions included in the memory 104. The functions of the processor 102 may be provided through the use of dedicated hardware as well as hardware capable of executing machine-readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, the processor 102 may execute instructions 106 to obtain configuration information of a first device for which vulnerability scanning is to be performed. Configuration information of the first device refers to information regarding hardware and software configuration of the first device. The configuration information may include telemetry data of the first device. Further, instructions 108 may be executed by the processor 102 to provision a second device based on the configuration information to create a cloned first device. In an example, the processor 102 may select the second device from a pool of device resources and may select the software to be configured on the second device from a pool of software resources. The selection may be based on a device type and configuration information of the first device. Accordingly, the processor 102 may configure software and hardware components of the second device to create the cloned first device.

In one example, the processor 102 may also obtain context information of the first device, such as data indicative of a security level of the first device, a user defined policy, compliance requisites, and an industry domain in which the first device operates. Context information of the first device refers to information about a context in which the first device is being used and is thus indicative of an intent with which a user is making use of the first device. The context information may be provided by a user on registration with the system 100 and stored in a repository as will be explained later with reference to FIG. 2. Security level of the first device refers to a user defined security level that is to be maintained for the first device. For example, for some devices, the user may define the security level as confidential while for other devices, the user may define the security level as low. User defined policy refers to a scanning policy that a user may define for customizing the vulnerability scanning to be performed on the first device. For example, a user may indicate a desired frequency of scanning, desired scanning tools to be used, and the like. Compliance requisites refer to regulatory or legal standards that have to be complied with based on the nature of use of the first device. Industry domain refers to area of application in which the first device is used, such as financial, social media, telecommunication, healthcare, administration/government services, and the like. Depending on the industry domain, the security level to be maintained and the compliance requisites to be complied with may vary. For example, the security level specified by a user for a server used for verifying financial transactions may be higher than a security level specified for a server that sends out mass marketing communications.

On obtaining the context information, the processor 102 may schedule the vulnerability scanning for the first device based on the context information to ensure that periodic scanning is performed and the compliance requisites, such as regulatory compliance requisites, are complied with. The vulnerability scanning may be performed on the cloned first device by the processor 102 on execution of instructions 110. In one example, the processor 102 may identify one or more scanning tools for performing the vulnerability scanning based on the configuration information and the context information. The processor 102 may scan the cloned first device using the identified scanning tools to obtain scanning results indicating issues identified by the scanning tools. Further, the processor 102 may process the scanning results to generate the scan report. For example, to process the scanning results, the processor 102 may flag false positive issues, merge and triage issues from multiple tools into vulnerabilities, and provide customized recommendations to mitigate the vulnerabilities based on a knowledge base stored in a repository. On performing the vulnerability scanning, the processor 102 may obtain a scan report and may provide the scan report as a scanning output for the first device, for example, on execution of instructions 112.

In one example, the processor 102 may generate a device fingerprint for the first device based on the device type, the context information and the configuration information and may store the scan report in a repository in association with the device fingerprint.

Further, if the processor 102 is to perform a vulnerability scanning for a third device, the processor 102 may obtain corresponding configuration information and corresponding context information for the third device. The processor 102 may then generate a corresponding device fingerprint for the third device based on its device type, the corresponding configuration information, and the corresponding context information. Thereafter, in response to determining that the corresponding device fingerprint of the third device matches with the device fingerprint of the first device, the processor 102 may obtain the scan report associated with the device fingerprint of the first device from the repository and provide the scan report as the scanning output for the third device.

Figure 2:
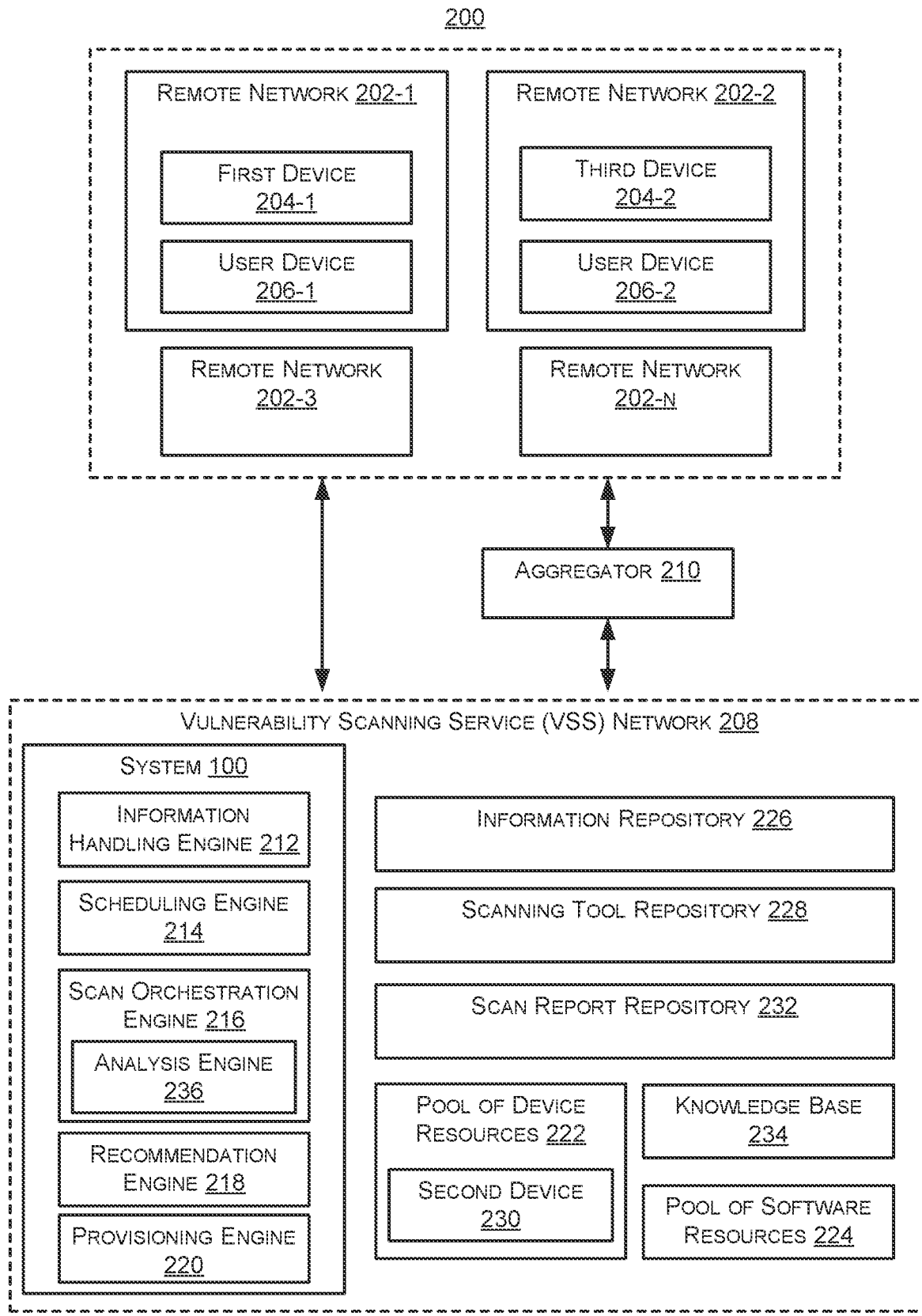
FIG. 2 illustrates an example network environment for performing vulnerability scanning, in accordance with principles of the present subject matter.

FIG. 2 illustrates an example network environment 200 for performing vulnerability scanning, in accordance with principles of the present subject matter.

As illustrated, the network environment 200 may include a plurality of remote networks 202-1, 202-2, 202-3 . . . 202-n, collectively referred to as remote networks 202. Each of the remote networks 202 may include a variety of computing devices, such as a networked device, a storage device, a server, or the like. Examples of the computing devices include servers, laptops, desktops, mobile computing devices, sensors, controllers, routers, storage devices, etc. Further, the remote networks 202 may correspond to one or more types of networks, for example, data center network, Edge network, public cloud network, private cloud network, and the like.

In one example, the remote network 202-1 may include a first device 204-1 and a user device 206-1. Similarly, the remote network 202-2 may include a third device 204-2 and a user device 206-2. The devices 204-1 and 204-2 may be computing devices on which vulnerability scanning is to be performed. The user devices 206-1 and 206-2 may be computing devices used, for example, by network administrators to request for vulnerability scanning of computing devices in the remote networks managed by them or view results from the vulnerability scans. It may be understood that vulnerability scanning may also be performed on the user devices 206-1 and 206-2 in a manner similar to that performed on the devices 204-1 and 204-2. While not shown in the figure for brevity, it may be understood that the remote networks 202-3 . . . 202-n will also include various computing devices including user devices.

The various computing devices in the remote networks 202 may be registered with a vulnerability scanning service (VSS) network 208. The VSS network 208 may be a cloud network that may be used to provide vulnerability scanning as a service. Communication between the VSS network 208 and the remote networks 202 may occur over a communication network (not shown in the figure), which may be a wireless or a wired network, or a combination thereof. The communication network may be a collection of individual networks, interconnected with each other and functioning as a single large network (e.g., the internet or an intranet). The VSS network 208 may include the system 100 to perform the vulnerability scanning remotely for the computing devices in the remote networks 202.

During registration of the computing devices with the VSS network 208, device type information, configuration information, and context information of the computing devices may be provided to the system 100. The device type information may include a product identifier, such as a device family and version/generation, to which a computing device belongs. For example, the product identifier may identify the computing device as server A generation 2, router R generation 10, etc. The configuration information may include, for example, hardware configuration including configuration of memory, processor, ports, etc., and software configuration including configuration of Operating System (OS), open network ports, applications, etc. The context information may include, for example, a security level of the first device, user defined policy for device security and vulnerability scanning, compliance requisites, and an industry domain in which the first device operates. The security level may include an asset security level identified by the user, for example secret, confidential, sensitive, and the like.

The compliance requisites may identify the applicable data security compliance standards or laws like PCI-DSS, General Data Protection Regulation (GDPR), Health Insurance Portability and Accountability Act (HIPAA), and the like. The user defined policy may indicate, for example, a user defined frequency at which the scanning is to be performed, a list of preferred scanning tools to be used, report format and extent of details of test results to be provided, and any other such policy that the user may define. The industry domain may include, for example, banking and financial services sector, telecommunication sector, e-commerce sector, and the like. While some of the configuration and context information may be automatically provided or obtained from the computing devices, some of it may have to be provided by network administrators. In case a computing device is repurposed later, for example, for operation in a different industry domain or for changing the hardware and/or software configuration, the registration information may be updated or the computing device may be re-registered.

After registration, the various computing devices may periodically send configuration information in the form of telemetry data to the system 100 over a respective secure channel. The telemetry data may include data regarding the performance of the computing devices, updates performed on the hardware and/or software configurations, and the like. In an example, the telemetry data of a computing device may include a snapshot of the hardware and software configuration of the computing device. The telemetry data may be sent automatically by telemetry agents that reside in the computing devices and are in communication with the system 100 over a secure channel. In one example, the telemetry data may be sent directly to the system 100. In another example, the telemetry data may be sent to an aggregator 210 that aggregates telemetry data from a plurality of computing devices and sends it to the system 100 for further processing.

The system 100, as discussed earlier, includes the processor 102, the memory 104, and instructions for performing vulnerability scanning. The instructions may reside in the memory 104 or in a separate storage device. For ease of discussion, the instructions may be considered to be a part of various engines that may be implemented as a combination of software and hardware. The engines may include an information handling engine 212, a scheduling engine 214, a scan orchestration engine 216, recommendation engine 218, and a provisioning engine 220.

The VSS network 208 may also include a pool of device resources 222 and a pool of software resources 224. The pool of device resources 222 may include at least one physical computing device of each device type that is present in the remote networks 202. For example, the remote networks 202 may include N number of servers of type 1 and M number of servers of type 2. The pool of device resources 222 may hence include at least one server of type 1 and at least one server of type 2. Similarly, the pool of software resources 224 may include at least one licensed copy of the different types and versions of OSs and applications that are present in the remote networks 202.

In operation, the information handling engine 212 may receive information including the device type information, the context information and the configuration information (including telemetry data) from the computing devices and store the information in a repository, such as the information repository 226. The information handing engine 212 may also generate a device fingerprint for each computing device based on the combination of the device type information, the context information, and the configuration information, and may store the device fingerprint along with the information in the information repository 226. The device fingerprint of a computing device may be, for example, a hash value of the combination of information related to the computing device. In one example, the information handling engine 212 may generate the device fingerprint on registration of the computing device and may update the device fingerprint before vulnerability scanning is to be performed for the computing device. Further, on device registration, the scheduling engine 214 may analyze the context information and create a schedule for scanning the computing device. The schedule may also be stored in the information repository 226. The scheduling engine 214 may check and update the schedule periodically or whenever the context information is updated by the information handling engine 212.

Based on the schedule or on receiving a user request, the scan orchestration engine 216 may receive a request for performing vulnerability scanning on a computing device. Considering an example where a vulnerability scanning request is received for the first device 204-1, the scan orchestration engine 216 may cause the recommendation engine 218 to analyze the device type information, configuration information, and context information of the first device 204-1 and recommend scanning tools to be used for effectively scanning the first device 204-1.

The scanning tools may be selected from a scanning tool repository 228, which may include licensed copies of the scanning tools that may be used for performing vulnerability scanning. The scanning tool repository 228 may be updated from time to time, for example, by a user, to ensure that appropriate scanning tools for different computing device types, industry domains, and compliance requisites are available. In one example, the scanning tool repository 228 may store a mapping table that maps each scanning tool with industry domains, security levels, compliance requisites, and computing device types for which it may be used, and an extent of false positive results provided by each of the scanning tools. The scanning tool repository 228 may also include preconfigured rules for selection of scanning tools. For example, a preconfigured rule may indicate which scanning tools may be used together for better scan coverage and which scanning tools may not be used together to avoid duplicate results. The preconfigured rules may be provided by a user and updated periodically based on user inputs. The recommendation engine 218 may use the mapping table and the preconfigured rules to recommend the scanning tools to be used for scanning the first device 204-1 to obtain reduced false positive results while at the same time providing desired scan coverage and meeting the scan intent in view of the context information.

The scan orchestration engine 216 may then cause the provisioning engine 220 to identify a device from the pool of device resources 222 that is of the same device type as the first device 204-1 and to provision the identified device as per the configuration information as the first device 204-1. For example, the provisioning engine 220 may identify a second device 230 as being of the same device type as the first device 204-1 and may provision the second device 230 to create a clone of the first device 204-1, referred to as a cloned first device. To provision the second device 230, the provisioning engine 220 may configure the hardware of the second device 230 according to the configuration information of the first device 204-1. Further, the provisioning engine 220 may install and configure software from the pool of software resources 224 on the second device 230 as per the configuration information of the first device 204-1. In one example, if a particular software application configured on the first device 204-1 is not available in the pool of software resources 224, a licensed copy of the software application may be acquired and added to the pool of software resources 224 or the scanning may be performed with an exception note stating that the particular software application has not been scanned.

Once the cloned first device is ready, the scan orchestration engine 216 may use the identified scanning tools to perform the vulnerability scanning on the cloned first device and obtain scanning results. The scan orchestration engine 216 may generate a scan report based on the scanning results and provide the scan report as a scanning output for the first device 204-1 to the user device 206-1. Further, the scan orchestration engine 216 may save the scan report with the device fingerprint of the first device 204-1 in a scan report repository 232. The scan report repository 232 may store the device fingerprint in a key/reference column and the scan report in a value/data column along with a time stamp indicating when the scan report was generated so that the scan report may be retrieved subsequently based on the device fingerprint.

In one example, the scan orchestration engine 216 may process the scanning results prior to generation of the scan report. The processing may include, for example, flagging false positive issues, merging and triaging issues into vulnerabilities, and providing recommendations to mitigate the vulnerabilities. For example, the scan orchestration engine 216 may include an analysis engine 236 that may use a knowledge base 234 to analyze the scanning results, identify related issues, merge and triage the issues, and provide recommendations for mitigation. Further, the analysis engine 236 may also identify false positives based on device specific false positive information stored in the knowledge base 234. The false positive information, recommendations for mitigation specific to different contexts, related issue identification, triaging information, etc. may be dynamically updated in the knowledge base 234 based on machine learning techniques or using feedback received from users, such as network administrators of the remote networks 202. Accordingly, the knowledge base 234 may be used to apply the learning gained from scanning one computing device when analyzing scanning results for other computing devices that operate in the same context.

In one example, on receiving a request for performing vulnerability scanning on a computing device, the scan orchestration engine 216 may query the scan report repository 232 to identify if a current vulnerability scanning is to be performed for the computing device or a previously generated scan report may be shared as the scanning output for the computing device. For example, considering that a request for performing vulnerability scanning for the third device 204-2 is received by the scan orchestration engine 216, a device fingerprint for the third device 204-2 may be obtained as discussed earlier. The scan orchestration engine 216 may determine from the scan report repository 232 whether a matching device fingerprint exists for the obtained device fingerprint and whether a scan report generated within a predefined time period is available for the matching finger print. The predefined time period may range from a few days to a few months depending on the context information, i.e., desired security level, user defined policy, compliance requisites to be met, etc. Accordingly, the predefined time period may be set automatically based on the context information or set by a user, such as a network administrator.

In case the matching device fingerprint does not exist or if a scan report that was generated within a predefined time period is not available, the scan orchestration engine 216 may determine that a current vulnerability scan has to be performed. In another example, a user may specifically request that a current vulnerability scanning is to be performed for the computing device. On determining that the current vulnerability scanning is to be performed, the scan orchestration engine 216 may cause a device to be provisioned from the pool of device resources 222 as per the configuration of the third device 204-2 and may perform the vulnerability scanning and generate the scan report as discussed earlier. On the other hand, if there is no specific user request and if there exists a matching device fingerprint and a scan report associated with the matching device fingerprint that was generated within the predefined time period, it may be determined that the current vulnerability scanning is not to be performed. In this case, the associated scan report is fetched by the scan orchestration engine 216 and provided as the scanning output for the third device 204-2.

Thus, the number of scans to be performed and time and resources to be used in performing the scans may be reduced. For example, there may be numerous computing devices of a particular device type operating across the remote networks 202 and a subset of those may have the same configuration and context because of which their device fingerprints may be identical. Therefore, the number of scans to be performed and resources used are substantially reduced in contrast to a scenario where a separate scan is performed directly on each computing device separately.

Further, as the scanning is performed on clones of the computing devices that are created in a separate network (VSS network 208), dedicated infrastructure and bandwidth may not have to be reserved for vulnerability scanning in each of the remote networks 202. Additionally, the vulnerability scanning is not affected even if there are connectivity issues between a remote network and the VSS network 208.

In one example, the scan report that is generated is provided to the user device in the respective remote network. For example, the scan orchestration engine 216 may provide the scan report of the first device 204-1 to the user device 206-1 and the report for the third device 204-2 to the user device 206-2. Users, such as network administrators, may view the scan report on a user interface on the user devices and take remedial actions to overcome the identified issues in view of the recommendations provided.

Figure 3:
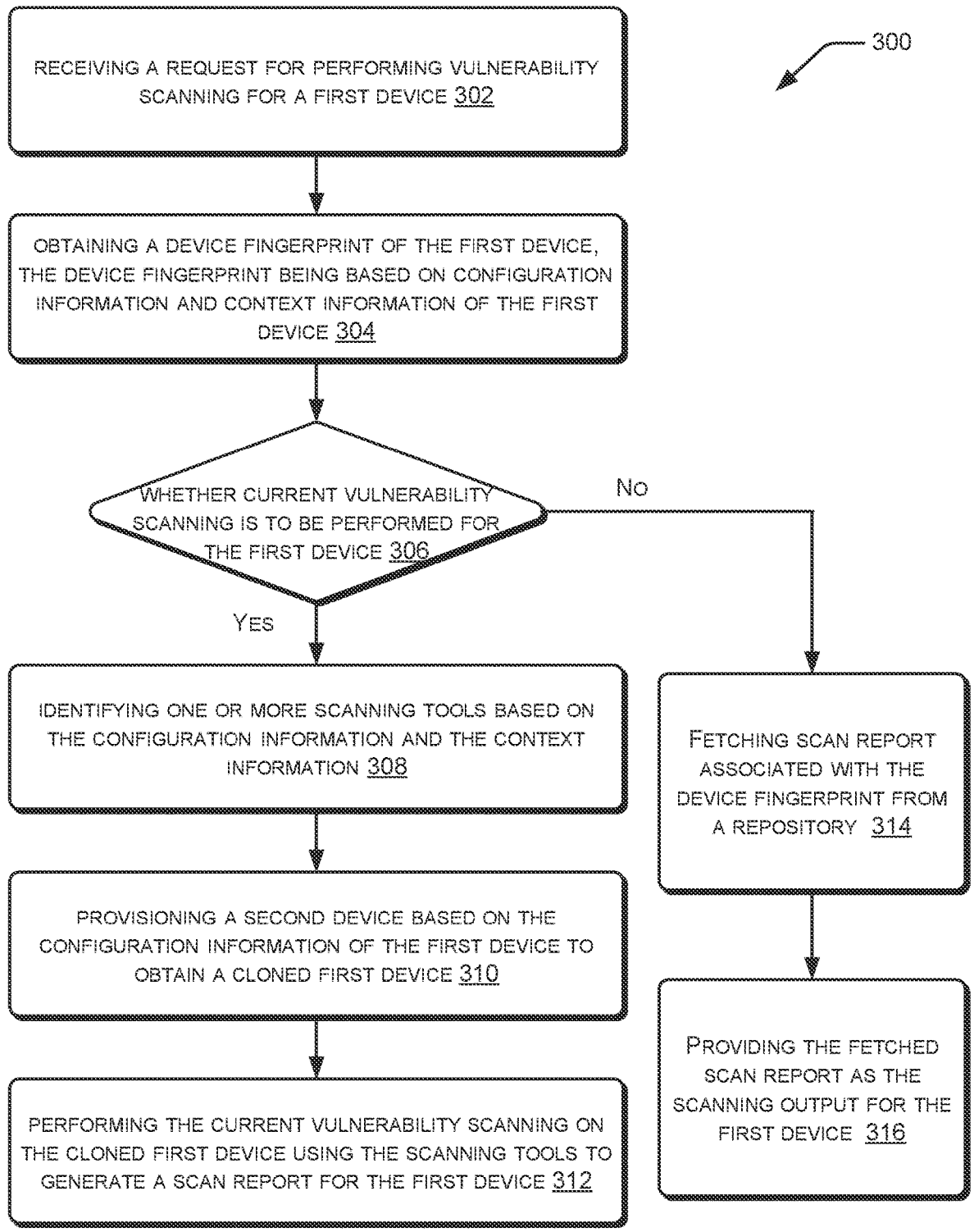
FIG. 3 illustrates an example method for vulnerability scanning, in accordance with principles of the present subject matter.
Figure 4:
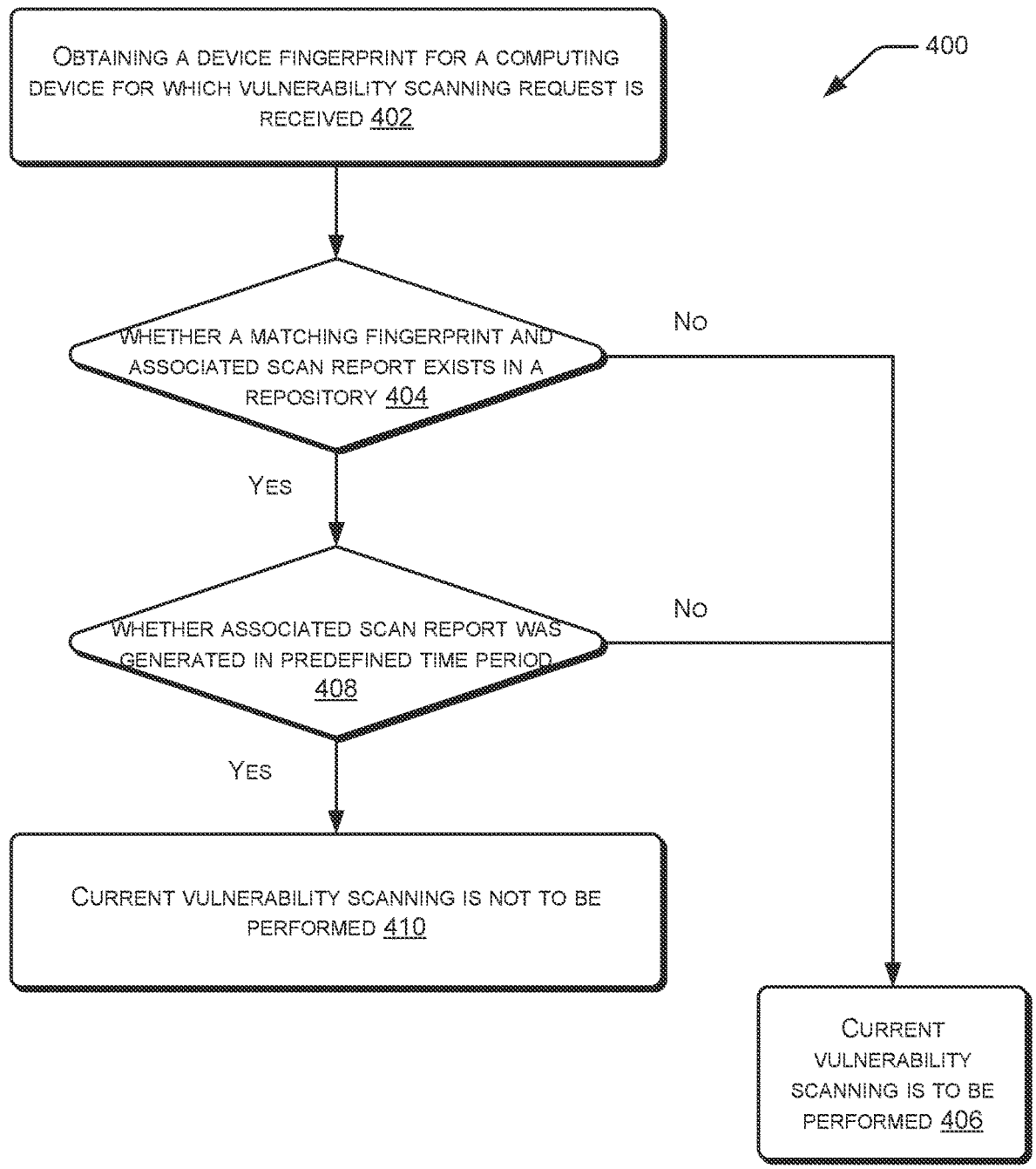
FIG. 4 illustrates an example method for determining whether a current vulnerability scan is to be performed, in accordance with principles of the present subject matter.

Aspects of the present subject matter will now be described with reference to methods implemented by various systems and devices. FIG. 3 illustrates an example method 300 for vulnerability scanning, in accordance with principles of the present subject matter; and FIG. 4 illustrates an example method 400 for determining whether a current vulnerability scan is to be performed, in accordance with principles of the present subject matter.

The order in which the methods 300 and 400 are described is not intended to be construed as a limitation, and any number of the described method blocks may be combined in any order to implement the methods 300 and 400, or alternative methods. Furthermore, the methods 300 and 400 may be implemented by processing resource(s) or computing device(s) through any suitable hardware, non-transitory machine-readable instructions, or a combination thereof.

It may be understood that steps of the methods 300 and 400 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. Although the methods 300 and 400 may be implemented in a variety of systems, they may be considered to be performed by the system 100 as discussed above, for ease of explanation. In an example, the steps of the methods 300 and 400 may be performed by a processing resource, such as the processor 102. For brevity, some of the details of how the method steps may be performed, which have been described above with reference to FIGS. 1 and 2, are not repeated again in the description of the methods 300 and 400.

Referring to method 300 of FIG. 3, at block 302, a request for performing vulnerability scanning for a first device is received. In one example, the request may be received based on a schedule of vulnerability scanning of the first device. The schedule may have been generated for the first device based on the context information of the first device. In another example, the request may be received from a user device, for example, when a user sends a request for performing vulnerability scanning through a user interface of the user device.

At block 304, a device fingerprint of the first device is obtained, the device fingerprint being based on configuration information and context information of the first device. The context information comprises data indicative of a security level of the first device, user defined policy, compliance requisites, and an industry domain in which the first device operates, and the configuration information comprises telemetry data received from the first device over a secure channel.

At block 306, it is determined, based on the device fingerprint, whether a current vulnerability scanning is to be performed for the first device. In one example, the determination may be based on whether a matching device fingerprint and associated scan report are present in a repository as explained in method 400 below with reference to FIG. 4. In another example, a user may request that a current vulnerability scanning is to be performed for the computing device, in which case, the method 400 may not be followed and the user request may override the method 400.

At block 308, in response to a positive determination that a current vulnerability scanning is to be performed, one or more scanning tools are identified based on the configuration information and the context information ("YES" branch from block 306). Further, at block 310, a second device is provisioned based on the configuration information of the first device to obtain a cloned first device.

At block 312, the current vulnerability scanning is performed on the cloned first device using the scanning tools to generate a scan report for the first device. The scan report may be provided as a scanning output to a user as discussed above. In one example, scanning results indicating issues identified by the scanning tools are obtained upon performing the current vulnerability scanning on the cloned first device. The scanning results are then processed based on a knowledge base stored in a repository to generate the scan report. Processing the scanning results may include flagging false positive issues, merging and triaging the issues into vulnerabilities, and providing recommendations to mitigate the vulnerabilities However, in case at block 306, it is determined that a current vulnerability scanning is not to be performed for the first device, the method moves to block 314 ("NO" branch from block 306). At block 314, scan report associated with the device fingerprint is fetched from a repository and at block 316, the fetched scan report is provided as the scanning output for the first device.

Referring to method 400 in FIG. 4, at block 402, a device fingerprint is obtained for a computing device for which vulnerability scanning request is received. At block 404, it is determined whether a matching fingerprint exists, in a repository, for the device fingerprint and whether a scan report is associated with the matching fingerprint. At block 406, if the matching fingerprint does not exist or there is no associated scan report ("NO" branch from block 404), it is determined that a current vulnerability scanning is to be performed. On the other hand, if the matching fingerprint does exist, ("YES" branch from block 404), at block 408 it is determined whether the associated scan report was generated within a predefined time period. If the associated scan report was generated outside a predefined time period, ("NO" branch from block 408), it is determined that a current vulnerability scanning is to be performed and method proceeds to block 406. However, if the associated scan report was generated inside a predefined time period, ("YES" branch from block 408), then method proceeds to block 410 where it is determined that a current vulnerability scanning is not to be performed. In this case, the scan report associated with the matching fingerprint may be fetched from the repository and provided to the user, as discussed earlier.

Figure 5:
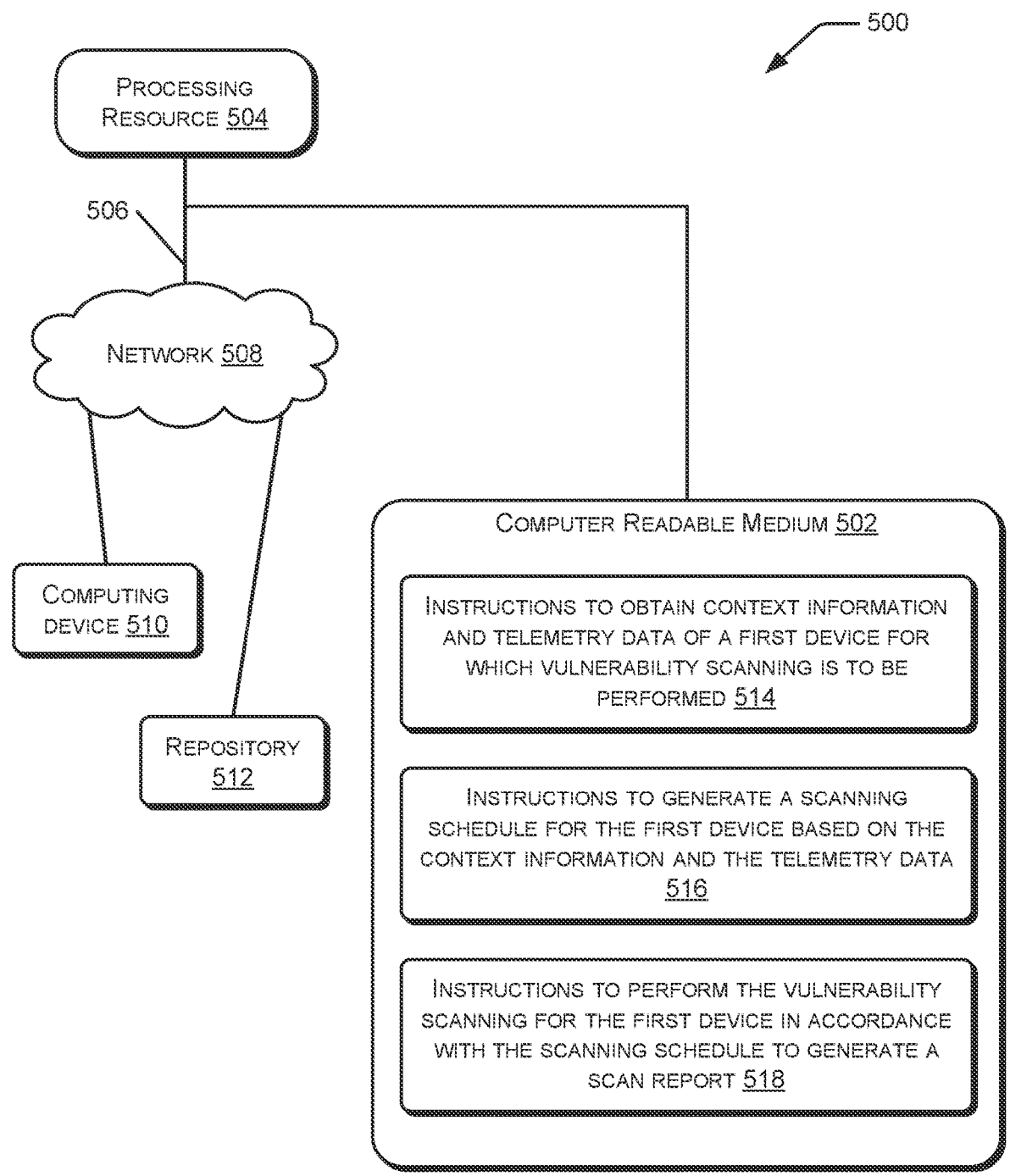
FIG. 5 illustrates an example computing environment implementing a non-transitory computer-readable medium for vulnerability scanning, in accordance with principles of the present subject matter.

FIG. 5 illustrates an example computing environment 500 implementing a non-transitory computer-readable medium 502 for vulnerability scanning, in accordance with principles of the present subject matter. In an example, the non-transitory computer-readable medium 502 may be utilized by a system, such as the system 100. In an example, the computing environment 500 may include a processing resource 504 communicatively coupled to the non-transitory computer-readable medium 502 through a communication link 506. The processing resource 504 may be, for example, the processor 102.

The non-transitory computer-readable medium 502 may be, for example, an internal memory device or an external memory device. In an example, the communication link 506 may be a direct communication link, such as any memory read/write interface. In another example, the communication link 506 may be an indirect communication link, such as a network interface. In such a case, the processing resource 504 may access the non-transitory computer-readable medium 502 through a network 508. The network 508 may be a single network or a combination of multiple networks and may use a variety of different communication protocols. Further, the processing resource 504 may also communicate with a computing device 510 over the network 508. The computing device 510 may be the second device that is provisioned for creating a clone of a first device for performing vulnerability scanning remotely. Additionally, the processing resource 504 may also communicate with a repository 512 over the network 508. The repository 512 may be, for example, one or more repositories that store the context information, configuration information, knowledge base for processing scan results, and device fingerprints and associated scan reports for a plurality of computing devices.

In an example implementation, the non-transitory computer-readable medium 502 includes a set of computer-readable instructions for performing vulnerability scanning. The set of computer-readable instructions can be accessed by the processing resource 504 through the communication link 506 and subsequently executed. For brevity, some of the details of functions performed on execution of the instructions, which have been described above with reference to FIGS. 1 and 2, are not repeated again in the description of FIG. 5.

Referring to FIG. 5, in an example, the non-transitory computer-readable medium 502 includes instructions for execution by the processing resource 504. The instructions include instructions 514 to obtain context information and telemetry data of a first device for which vulnerability scanning is to be performed. Further, it includes instructions 516 to generate a scanning schedule for the first device based on the context information and the telemetry data and instructions 518 to perform the vulnerability scanning for the first device in accordance with the scanning schedule to generate a scan report. In one example, to perform the vulnerability scanning, the instructions 518 cause the processing resource 504 to identify scanning tools based on the telemetry data and the context information, provision a second device (such as the computing device 510) based on the telemetry data to create a cloned first device, and scan the cloned first device using the scanning tools. In one example, scanning results obtained from scanning the cloned first device may be processed based on a knowledge base stored in a repository, to generate the scan report.

In one example, non-transitory computer-readable medium 502 may include additional instructions to allow the system 100 as discussed above to be realized. For example, the non-transitory computer-readable medium 502 may include instructions to generate a device fingerprint for the first device based on the context information and the configuration information. Further the instructions may cause the processing resource 504 to store the scan report, in a repository, in association with the device fingerprint and one or more other device fingerprints that match the device fingerprint.

In one example, non-transitory computer-readable medium 502 may include instructions to compare a device fingerprint of the first device with a plurality of fingerprints stored in a repository to identify a matching fingerprint for the device fingerprint, and determine whether a current vulnerability scan is to be performed for the first device based on the comparison. The determination of whether a current vulnerability scan is to be performed for the first device may be performed as discussed above with reference to FIGS. 3 and 4. In response to determining that the current vulnerability scan is not to be performed, an associated scan report that is associated with the matching fingerprint in the repository may be provided as the scan report for the first device.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

I claim:

1. A system comprising:
   a processor; and
   a non-transitory storage medium comprising instructions executable on the processor to:
   obtain first configuration information of a first device for which vulnerability scanning is to be performed, the first configuration information comprising telemetry data of the first device;
   obtain first context information of the first device, the first context information comprising data indicative of a security level of the first device;

provision a second device based on the first configuration information to create a cloned first device;
perform the vulnerability scanning on the cloned first device to obtain a scan report;
generate a first device fingerprint for the first device based on the first context information and the first configuration information;
store, in a repository, the scan report in association with the first device fingerprint;
to perform a vulnerability scanning for a third device, generate a second device fingerprint for the third device based on second context information and second configuration information of the third device; and
in response to determining that the second device fingerprint matches the first device fingerprint, obtain the scan report associated with the first device fingerprint from the repository, and provide the scan report as a scanning output for the third device.

2. The system of claim 1, wherein the first context information of the first device further comprises a user defined policy, compliance requisites, and an industry domain in which the first device operates, and wherein the instructions are executable on the processor to:
schedule the vulnerability scanning on the cloned first device based on the first context information.

3. The system of claim 2, wherein, to perform the vulnerability scanning on the cloned first device, the instructions are executable on the processor to:
identify one or more scanning tools for performing the vulnerability scanning on the cloned first device based on the first configuration information and the first context information;
scan the cloned first device using the one or more scanning tools to obtain scanning results indicating issues identified by the one or more scanning tools; and
process the scanning results to generate the scan report.

4. The system of claim 3, wherein, to process the scanning results, the instructions are executable on the processor to flag false positive issues, merge and triage issues into vulnerabilities, and provide recommendations to mitigate the vulnerabilities based on a knowledge base stored in a repository.

5. The system of claim 1, wherein the first configuration information comprises a hardware configuration and a software configuration of the first device, the hardware configuration comprising a configuration of one or more of a memory or a processor of the first device, and wherein the instructions are executable on the processor to:
identify the second device by selecting a device of a same device type as the first device from among a pool of devices,
wherein the provisioning of the second device comprises configuring hardware of the second device according to the hardware configuration and configuring software in the second device according to the software configuration.

6. The system of claim 1, wherein the instructions are executable on the processor to:
schedule the vulnerability scanning on the cloned first device based on the first context information.

7. A non-transitory computer-readable medium comprising instructions executable by a processing resource to:
receive a request for performing vulnerability scanning for a first device;
obtain first configuration information of the first device, the first configuration information comprising a hardware configuration and a software configuration of the first device, the hardware configuration comprising a configuration of one or more of a memory or a processor of the first device;
identify a second device of a same device type as the first device from among a pool of devices;
provision the second device based on the first configuration information of the first device to obtain a cloned first device, the provisioning of the second device comprising configuring hardware of the second device according to the hardware configuration and configuring software in the second device according to the software configuration;
perform the vulnerability scanning on the cloned first device to generate a scan report for the first device;
generate a first device fingerprint for the first device based on first context information and the first configuration information of the first device;
store, in a repository, the scan report in association with the first device fingerprint;
to perform a vulnerability scanning for a third device, generate a second device fingerprint for the third device based on second context information and second configuration information of the third device; and
in response to determining that the second device fingerprint matches the first device fingerprint, obtain the scan report associated with the first device fingerprint from the repository, and provide the scan report as a scanning output for the third device.

8. The non-transitory computer-readable medium of claim 7, further comprising instructions executable by the processing resource to:
generate a schedule for performing the vulnerability scanning for the first device based on the first context information,
wherein the request for performing the vulnerability scanning is based on the schedule.

9. The non-transitory computer-readable medium of claim 7, further comprising instructions executable by the processing resource to:
determine that the vulnerability scanning for the first device is to be performed based on a matching fingerprint existing for the first device fingerprint in the repository and an associated scan report stored in the repository for the matching fingerprint being generated outside a predefined time period.

10. The non-transitory computer-readable medium of claim 7, further comprising instructions executable by the processing resource to:
provide the scan report as the scanning output for the third device further in response to determining that the scan report for the first device was generated within a predefined time period.

11. The non-transitory computer-readable medium of claim 7, wherein the obtaining of the scan report associated with the first device fingerprint from the repository, and the providing of the scan report as the scanning output for the third device are performed instead of performing the vulnerability scanning on the third device.

12. The non-transitory computer-readable medium of claim 7, further comprising instructions executable by the processing resource to:
schedule the vulnerability scanning on the cloned first device based on the first context information of the first device, the first context information comprising data indicative of a security level of the first device.

13. The non-transitory computer-readable medium of claim 12, wherein the first context information further comprises a user defined policy, compliance requisites, and an industry domain in which the first device operates.

14. The non-transitory computer-readable medium of claim 7, wherein the performing of the vulnerability scanning on the cloned first device comprises:
scanning the cloned first device using scanning tools to obtain scanning results indicating issues identified by the scanning tools; and
processing the scanning results based on a knowledge base to generate the scan report, wherein the processing of the scanning results comprises flagging false positive issues, merging and triaging issues into vulnerabilities, and providing recommendations to mitigate the vulnerabilities.

15. A non-transitory computer-readable medium comprising instructions executable by a processing resource to:
obtain context information and configuration information of a first device for which vulnerability scanning is to be performed;
generate a scanning schedule for the first device based on the context information;
perform the vulnerability scanning for the first device in accordance with the scanning schedule to generate a scan report, wherein, to perform the vulnerability scanning, the instructions are executable by the processing resource to:
identify a scanning tool based on the configuration information and the context information,
provision a second device based on the configuration information to create a cloned first device, and
scan the cloned first device using the scanning tool;
compare a device fingerprint of a third device with a plurality of fingerprints stored in a repository to identify a matching fingerprint for the device fingerprint;
determine whether a current vulnerability scan is to be performed for the third device based on the comparison; and
in response to determining that the current vulnerability scan is not to be performed, provide a scan report that is associated with the matching fingerprint in the repository as a scan report for the third device.

16. The non-transitory computer-readable medium of claim 15, further comprising instructions executable by the processing resource to:
generate a device fingerprint for the first device based on the context information and the configuration information of the first device; and
store the scan report for the first device in the repository in association with the device fingerprint for the first device.

17. The non-transitory computer-readable medium of claim 15, wherein the configuration information of the first device comprises a hardware configuration and a software configuration of the first device, the hardware configuration comprising a configuration of one or more of a memory or a processor of the first device, and wherein the provisioning of the second device comprises configuring hardware of the second device according to the hardware configuration and configuring software in the second device according to the software configuration.

18. The non-transitory computer-readable medium of claim 15, further comprising instructions executable by the processing resource to process scanning results obtained from scanning the cloned first device, based on a knowledge base stored in a repository, to generate the scan report.

* * * * *